(12) United States Patent
Reo

(10) Patent No.: US 6,311,364 B1
(45) Date of Patent: *Nov. 6, 2001

(54) SILICONE RUBBER WINDSHIELD WIPER BLADE AND METHOD OF PRODUCTION

(75) Inventor: Ned J. Reo, Scotia, NY (US)

(73) Assignee: Specialty Silicone Products, Inc., Ballston Spa, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/137,056
(22) PCT Filed: Sep. 10, 1993
(86) PCT No.: PCT/US93/08630
§ 371 Date: Nov. 8, 1995
§ 102(e) Date: Nov. 8, 1995
(87) PCT Pub. No.: WO95/07200
PCT Pub. Date: Mar. 16, 1995

(51) Int. Cl.$^7$ .............................. B60S 1/38; B32B 25/20
(52) U.S. Cl. ........................ 15/250.48; 15/245; 428/325; 428/331; 428/336; 428/422; 428/447; 428/451; 264/130; 264/241; 264/255; 264/340
(58) Field of Search ............... 15/250.361, 250.48, 15/250.41, 250.4, 245, 250.44; 264/127, 130, 338, 340, 248, 241, 255; 428/336, 408, 327, 492, 493, 328, 407, 325, 331, 422, 447, 451

(56) References Cited

U.S. PATENT DOCUMENTS

| | | | |
|---|---|---|---|
| 2,908,028 | * 10/1959 | Runton et al. | 15/250.4 |
| 3,898,314 | * 8/1975 | Church | 264/338 |
| 4,103,385 | * 8/1978 | Porter | 15/250.48 |
| 4,282,285 | * 8/1981 | Mohiuddin | 264/255 |
| 4,350,739 | * 9/1982 | Mohiuddin | 264/255 |
| 4,622,712 | * 11/1986 | Sugita et al. | 15/250.48 |
| 4,638,525 | * 1/1987 | Sugita et al. | 15/250.48 |
| 4,716,618 | * 1/1988 | Yasukawa et al. | 15/250.48 |
| 4,912,803 | * 4/1990 | Yasukawa et al. | 15/250.48 |
| 5,107,563 | * 4/1992 | Zimmerman et al. | 15/250.48 |
| 5,283,927 | * 2/1994 | Gibbon et al. | 15/250.48 |
| 5,478,605 | * 12/1995 | Ichise | 264/146 |

FOREIGN PATENT DOCUMENTS

| | | | |
|---|---|---|---|
| 622370 | * 5/1949 | (GB) | 15/250.4 |
| 30646 | * 2/1982 | (JP) | 15/250.48 |

* cited by examiner

Primary Examiner—Gary K. Graham
(74) Attorney, Agent, or Firm—Schmeiser, Olsen & Watts

(57) ABSTRACT

A silicone rubber windshield wiper blade 10 having a coefficient of friction of 0.2 formed by embedding a tetrafluoroethylene polymer 43 such as Teflon plastic into a surface region of the blade 10.

30 Claims, 1 Drawing Sheet

SILICONE RUBBER WINDSHIELD WIPER BLADE AND METHOD OF PRODUCTION

FIELD OF THE INVENTION

This invention relates generally to silicone rubber windshield wipers, and is more particularly concerned with novel wipers having an unique combination of low coefficient of friction and long service life and with a new method for producing them.

BACKGROUND OF THE INVENTION

The windshield wiper has long been an attractive subject for development efforts, particularly to improve operating characteristics and cleaning effectiveness over extended periods. The demand for a better combination of high performance and long service life, however, remains unsatisfied. Incremental gains toward that goal have been made but always at the expense of significant penalty. Recently the trend has been toward the use of new materials of fabrication, silicone rubber attracting considerable attention in spite of its well-known high coefficient of friction characteristic because of its noted durability and utility over a broad range of operating conditions. To bring the silicone rubber friction coefficient down to a reasonable and acceptable level for windshield wiper purposes, others have added various materials in compounding it. Also attempts have been made to coat or cover silicone wiper blades with low friction coefficient materials such as $Teflon^T$ plastic or other elastomeric tetrafluoroethylene polymer having similar properties. In all instances, however, either the desired friction coefficient was not reached or the service life was considerably less than required because of rapid loss of the covering material.

SUMMARY OF THE INVENTION

This invention, which is based upon my discoveries and new concepts set out below, provides the solution to this long standing problem. Thus, both coefficient of friction and service life requirements can be met consistently. Moreover, this new result does not entail any substantial cost penalty or other offsetting disadvantage.

In making this invention, I discovered that it is possible to gain the low coefficient of friction property of Teflon plastic without sacrificing the long service life of the silicone rubber substrate. This I found on turning away from covering the windshield wiper wiping surface with Teflon plastic films or sheets sprayed or brushed on or adhesively attached, which do not last nearly long enough. Instead I subjected the silicone rubber wiper blade to pressure in a heated mold with Teflon plastic cover material in contact with the wiper. The plastic was sunk or embedded to substantial extent in the surface region of the silicone rubber wiper blade. Surprisingly, this novel product proved to have a coefficient of friction of 0.2, which it retained under conditions of normal use for an acceptably long time.

Following that course, I shortly later conceived the idea of making this new wiper blade by coating the inside wall of the wiper blade mold with the Teflon plastic material. I found that a uniform coating of Teflon plastic can thereby be transferred to the silicone rubber substrate as a coating of essentially uniform thickness embedded to the extent of up to about half its thickness in the silicone rubber blade. Then I found, surprisingly, that consistently good results can be gained by providing a "permanent" elastomeric polytetrafluoroethylene coating to the mold interior surface and then overcoating with Teflon plastic or equivalent and removing the molded silicone rubber windshield wiper blade after the overcoating has been securely bonded to the blade. The separation of the blade product from the mold permanent coating is clean and complete along the coating-overcoating interface and the permanent coating is therefore reusable many times without significant wear or loss of surface quality.

As an alternative the Teflon plastic or other equivalent plastic may be applied by brushing, spraying or otherwise depositing on the silicone rubber substrate prior to placing it in the windshield wiper mold. An important consideration in the practice of this invention is pressure at temperature sufficient to force the Teflon plastic into the surface of the silicone rubber.

It was not at all expected that such a great increase in wear of the plastic cover on a silicone windshield wiper in these various ways, can be gained in this manner. This may result in or involve a chemical reaction between the silicone rubber and the Teflon plastic, but it does not appear that a physical admixture results or accounts for the tenacious adherence of the Teflon plastic in the surface region of the substrate where it exerts its lubricating effect for very much longer than the Teflon plastic covers applied in accordance with the prior art described above. The bonding that results is weld-like in form and effect whatever reason—chemical, physical or both—may be.

Further in accordance with my new concepts involved here, other materials than Teflon plastic and like tetrafluoroethylene polymer elastomers may be used to gain the new advantages and results of this invention. The criteria for selection of such materials are compatibility with the silicone rubber, coefficient of friction matching that of Teflon plastic and tenacious attachment of the coating or covering material in the surface region of the silicone rubber body.

Briefly, then, in its method aspect the present invention comprises the steps of forming a silicone rubber windshield wiper blade, applying a layer of tetrafluoroethylene polymer to the blade and pressing the assembly together and thereby forcing the polymer layer into the blade surface to a depth of at least 0.001 mil. In preferred practice the three steps are carried out simultaneously and the tetrafluoroethylene polymer is provided in the form of a coating on the inside surface of a mold in which the wiper blade is formed.

Likewise stated in essence, a silicone rubber windshield wiper blade of this invention has a basic blade portion to bear against a windshield surface to serve the clearing or cleaning purpose, the basic blade portion carrying a layer of tetrafluoroethylene polymer embedded in its surface region and exposed for wiping contact with a windshield surface.

BRIEF DESCRIPTION OF THE DRAWINGS

Novel features of the articles of this invention are illustrated in the drawings accompanying and forming a part of this specification, in which.

DETAILED DESCRIPTION OF THIS INVENTION

Figure 1:
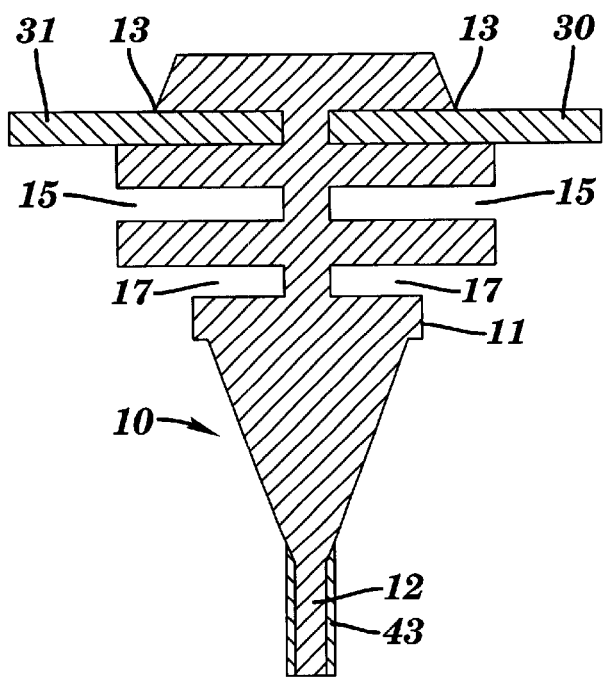
FIG. 1 is an enlarged traverse sectional view of a silicone windshield wiper blade of this invention.

In presently preferred practice of the invention, silicone rubber is molded in the form of windshield wiper blade 10 having an elongated body portion 11 and a basic blade portion 12 projecting therefrom. The body portion has three pair of recesses 13, 15 and 17 extending axially from one end of the body 10 to near the other end thereof. Between blind end 20 of each of recesses 15 and 17 a short recess (not shown) blind at both ends is provided to receive and retain flanged gripping elements of a windshield wiper blade mounting structure (not shown) typically of the bow type presently in general use.

Thin metal mounting strips 30 and 31 are carried in recesses 13 and extend almost the full length of the mounting structure. Blade 10 as offered for sale as original or replacement equipment may commonly be provided as a combination of blade 10 one or both of the mounting strips. Alternatively, blade 10 may be marketed as part of an assembly including mounting structure of the conventional bow type or other form which is provided with attachment means securing blade 10 with or without a metal mounting strip.

Figure 3:
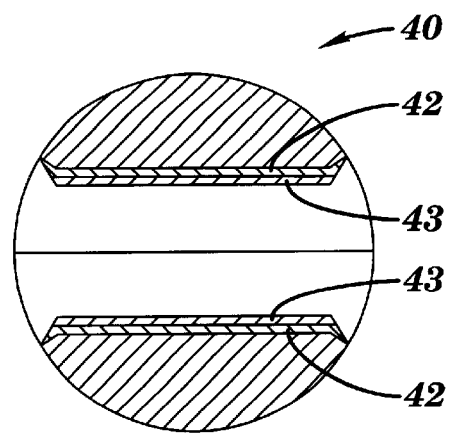
Figure 2:
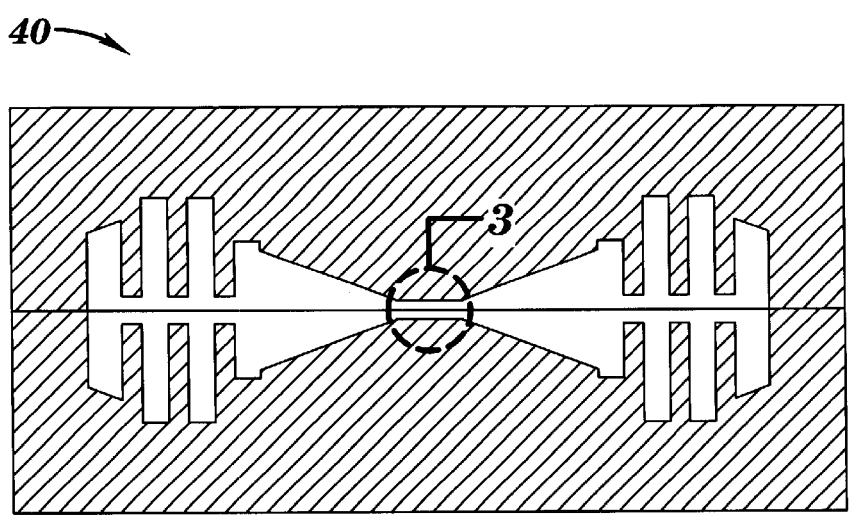
FIG. 2 is a transverse sectional view of a mold for producing a siamese pair of FIG. 1 windshield wipers; and, FIG. 3 is an enlarged view of the necked portion of FIG. 2 mold showing the Teflon coating on the mold inside surface.

In making the product of this invention, isostatic pressure is employed and a metal mold 40 is used, being charged with the silicone rubber fill after the interior surface of the mold has been coated with tetrafluoroethylene polymer such as Teflon plastic or like material having similar friction coefficient characteristic. Coating C consists of a "permanent" coat 42 on the mold metal inner surface and a coat 43 which overlays coat 42 which is removed intact with the ultimate molded wiper blade product. Coat 42 is of substantially uniform thickness about 3 to 5 mils, while coat 43 is uniformly about 4 to 6 mils thick. As shown FIGS. 2 and 3, only that part of the mold 40 in which windshield-contacting portion 12 of wiper blade 10 is formed is provided with coating C.

The mold so prepared is closed and heated to cure the silicone rubber and tetrafluoroethylene polymer as isostatic pressure of 500–1500 lbs. per square inch is applied to the mold contents. Higher pressures are possible up to the limits of the mold, however, it is not expected that pressures over 1500 lbs. PSI will provide no additional benefit. The polymer material overcoat 43 is thereby substantially totally transferred to the silicone rubber wiper as it is being formed. Coating 43 is also sunk and embedded in the wiper surface region to a depth between about 0.001 to 0.100 mil.

Should the entire interior surface of the mold be covered with the polymer coats and 42 and 43, the resulting silicone rubber body will be entirely covered with the polymer overcoat embedded in its surface. But preferably, the polymer coating on the mold interior surface is limited to the basic blade-forming portion of the mold, i.e., that part of it facing the windshield wiper-engaging part of the windshield wiper blade.

Instead of applying the tetrofluoroethylene polymer to the silicone rubber blade as just described, it may be a thin film cut to size and shape and fitted in place on the mold interior surface. Then, when the filled mold is closed and heated and subjected to requisite high isostatic pressure, the tetrafluoroethylene thin material is sunk or embedded into the surface of the silicone rubber body, as in the prior case. Also, again as in the mold coating procedure, only that part of the blade surface which is to engage the windshield in a wiping or clearing action is necessarily provided with the tetrafluoroethylene polymer surface for the new results and advantages of this invention. Thus, the material is cut to the pattern to be applied to the blade.

The following illustrative, but not limiting, examples of the practice of this invention as it has been carried out in full scale test are set forth in the interest of full and complete description of the invention in both its product and process aspects.

EXAMPLE I

A siamese pair of silicone rubber windshield wiper blades were molded to a finished form with Teflon plastic covering the windshield-contacting portion of each blade and embedded or countersunk therein by subjecting a silicone rubber blank in a stainless steel windshield wiper blade mold to pressure of 500–500 lbs. per square inch at a temperature of 177° for ten minutes.

The mold was prepared for the molding operation by providing on the inside surface of the siamese portion of the mold a "permanent" coating of Teflon plastic of uniform thickness about 4.0 mils. The method employed was that used in commercial production of Teflon plastic-coated domestic cooking utensils.

A silicone rubber composition was made of 70 parts SE860, 30 parts SE875, 1.2 parts CA4 Silicone-all Products of General Electric Company, the—860 and—875 being hydride containing and heat curable, while the CA 4 is platinum-containing heat curable silicone of the same concern. To the mix, four parts of ground glass (Potters Co.) and one part of powdered graphite-350 marketed by Superior Graphite were slowly added as the mass was homogenized in a two-roll rubber mill.

The silicone rubber mix was then cast as a sheet and cut out in pre-form strips which were placed individually in the mold and formed to shape sequentially. Prior to closing the mold and applying heat and pressure to each strip or blank, the "permanent" Teflon plastic coating on the mold siamese section inner wall was sprayed with Teflon plastic in some instances and with Durafilm$^R$ polytetrafluoroethlylene in other cases, providing an over-coat of uniform thickness about 5.0 mils.

Then, with the mold closed, the temperature of the mold was raised from room temperature to 177° C. as the pressure on the mold and contents was raised to 1,444 lbs. per square inch.

After 8 minutes at such temperature and pressure, the mold was air cooled to room temperature and the pressure was reduced to ambient. Then on opening the mold, the windshield wiper blade pair was removed and separated by cutting through at the midpoint of the length of the siamese section. It should be noted, however, that in mass manufacturing, the molds can be loaded and unloaded when hot.

EXAMPLE II

Using the stainless steel mold of Example 1 and preparing as described above, a pair of colored windshield wipers of the invention were made by the procedure of Example I except that instead of using graphite in compounding the silicone rubber mix, red pigment on particulate-form was added to GE SE860—SE875—CA4-ground glass mix as it was run thru the rubber mill.

In each and every one of the procedures of Examples I and II, the separation of the Teflon plastic-coated wiper product from the permanent Teflon coating on the mold was clean and smooth of surface, no break or tear of either the wiper coating or the mold coating appearing in any instance.

While red was the color used in producing the wiper products of Example II, it will be understood by those skilled in the art that other colors may be used in the same way to provide these products for the purchasers' choice. Further, the proportion of coloring matter employed in the silicone rubber mix and the form of it—particulate solid or liquid may be used for the desired coloration effect. It should, however, be chemically inert in respect to the other constituents of the silicone mix and the Teflon plastic or other polytetrafluoroethylene coating applied to the wiper blade products.

In this specification and in the appended claims, whenever ratio, percentage or proportion is mentioned, reference is to the weight basis unless otherwise expressly stated.

What is claimed is:

1. A windshield wiper, comprising:
   a blade portion that includes heat-cured rubber; and
   a coating, attached to said blade portion, said coating having a surface region and an embedded region, wherein said surface region consists essentially of polytetrafluoroethylene, wherein said embedded region is a bonding of the heat-cured rubber and the polytetrafluoroethylene, and wherein the polytetrafluoroethylene in the surface region is not dispersed within a medium made of a material that differs from the polytetrafluoroethylene.

2. The windshield wiper of claim 1, wherein the embedded region includes up to about half of the thickness of the coating.

3. The windshield wiper of claim 1, wherein the embedded region has a depth between about 0.001 mils to about 0.100 mils.

4. The windshield wiper of claim 1, wherein the coating has a thickness between about 4 mils and about 6 mils.

5. The windshield wiper of claim 1, wherein the embedded region includes a depth D, and wherein the coating has a thickness that exceeds D by a factor between about 40 and about 6000.

6. The windshield wiper of claim 1, wherein the heat-cured rubber includes heat-cured silicone rubber.

7. The windshield wiper of claim 1, further comprising a body portion that includes the heat-cured rubber, wherein the blade portion is coupled to the body portion.

8. The windshield wiper of claim 7, wherein the surface region covers a part of the body portion, and wherein the embedded region is integrally embedded within an outer region of the part such that the embedded region is bonded to the part.

9. The windshield wiper of claim 8, wherein the part includes the entire body portion.

10. A windshield wiper, comprising:
    a blade portion that includes heat-cured rubber; and
    a coating, attached to said blade portion, said coating having a surface region and an embedded region, wherein said surface region consists essentially of polytetrafluoroethylene, wherein said embedded region is a bonding of the heat-cured rubber and the polytetrafluoroethylene, and wherein the windshield wiper has a coefficient of friction of 0.2 and is reusable many times without significant wear or loss of surface quality.

11. A method of making a windshield wiper, comprising the steps of:
    providing a mold;
    inserting a transferable overcoat into the mold, wherein the transferable overcoat consists essentially of polytetrafluoroethylene, and wherein the polytetrafluoroethylene is not dispersed within a dispersion medium;
    placing a heat-curable rubber mix into the mold; and
    heating and pressurizing the rubber mix to a pressure and temperature, respectively, sufficient to heat-cure the rubber mix and to force a portion of the transferable overcoat to become integrally embedded within the rubber mix and bonded to the rubber mix such that a surface region of the transferable overcoat consists essentially of the polytetrafluoroethylene.

12. The method of claim 11, wherein the pressure is at least about 500 pounds per square inch (psi) and less than a highest pressure that can be withstood by the mold.

13. The method of claim 11, wherein the pressure is between about 500 psi and about 1500 psi.

14. The method of claim 11, wherein the temperature is at least about 177° C.

15. The method of claim 11, wherein the pressure is between about 500 psi and about 1500 psi, and wherein the temperature is at least about 177° C.

16. The method of claim 11, further comprising providing a permanent polytetrafluoroethylene coat on an inside surface of the mold.

17. The method of claim 11, wherein the step of inserting a transferable overcoat into the mold includes at least one of spraying and brushing the transferable overcoat on a permanent polytetrafluoroethylene coat.

18. The method of claim 11, further comprising closing the mold prior to the step of heating and pressurizing the rubber mix.

19. The method of claim 11, wherein the step of heating and pressurizing the rubber mix includes heating and pressurizing the rubber mix for at least 10 minutes.

20. The method of claim 11, wherein the forcing of the portion of the transferable overcoat to become integrally embedded within the rubber mix includes forcing the transferable overcoat to penetrate to a depth within the rubber mix of up to about half of the thickness of the transferable overcoat.

21. The method of claim 11, wherein the forcing of the portion of the transferable overcoat to become integrally embedded within the rubber mix includes forcing the transferable overcoat to penetrate to a depth within the rubber mix of between about 0.001 mils to about 0.100 mils.

22. The method of claim 11, wherein the transferable overcoat has a thickness between about 4 mils and about 6 mils.

23. The method of claim 11, wherein the forcing of the portion of the transferable overcoat to become integrally embedded within the rubber mix includes forcing the transferable overcoat to penetrate to a depth D within the rubber mix, and wherein the transferable overcoat has a thickness that exceeds D by a factor between about 40 and about 6000.

24. The method of claim 11, wherein the heat-curable rubber mix in the placing step includes heat-curable silicone rubber.

25. The method of claim 11, further comprising removing from the mold the heat-cured rubber mix and the transferable overcoat bonded thereto, wherein the removed heat-cured rubber mix and transferable overcoat includes a windshield wiper blade of the windshield wiper.

26. The method of claim 25, wherein the windshield wiper blade so removed comprises a blade portion and the transferable overcoat, wherein the blade portion includes the heat-cured rubber mix, and wherein the transferable overcoat has a surface region and an embedded region, wherein the surface region consists essentially of the polytetrafluoroethylene, and wherein the embedded region includes the polytetrafluoroethylene and is integrally embedded within an outer region of the blade portion such that the transferable overcoat portion is bonded to the outer region.

27. The method of claim 26, wherein the windshield wiper blade so removed further comprises a body portion that includes the heat-cured rubber, and wherein the blade portion is coupled to the body portion.

28. The method of claim 27, wherein the surface region covers a part of the body portion, and wherein the embedded region is integrally embedded within an outer region of the part such that the embedded region is bonded to the part.

29. The method of claim 28, wherein the part includes the entire body portion.

30. The method of claim 26, further comprising: using the transferable overcoat; and reusing the transferable overcoat many times without significant wear or loss of surface quality.

* * * * *